(12) United States Patent
Alzetto et al.

(10) Patent No.: US 11,085,892 B2
(45) Date of Patent: Aug. 10, 2021

(54) DETERMINATION OF THE THERMAL RESISTANCE OF A WALL

(71) Applicant: SAINT-GOBAIN ISOVER, Courbevoie (FR)

(72) Inventors: Florent Alzetto, Levallois Perret (FR); Johann Meulemans, Paris (FR); Guillaume Pandraud, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 437 days.

(21) Appl. No.: 15/547,816

(22) PCT Filed: Feb. 5, 2016

(86) PCT No.: PCT/FR2016/050253
§ 371 (c)(1),
(2) Date: Aug. 1, 2017

(87) PCT Pub. No.: WO2016/124870
PCT Pub. Date: Aug. 11, 2016

(65) Prior Publication Data
US 2018/0017511 A1 Jan. 18, 2018

(30) Foreign Application Priority Data
Feb. 6, 2015 (FR) ..................................... 1550970

(51) Int. Cl.
*G01N 25/18* (2006.01)
*G01K 17/20* (2006.01)

(52) U.S. Cl.
CPC ............ *G01N 25/18* (2013.01); *G01K 17/20* (2013.01)

(58) Field of Classification Search
CPC .............................. G01N 25/18; G01K 17/20
See application file for complete search history.

(56) References Cited

U.S. PATENT DOCUMENTS 4,568,198 A * 2/1986 Szabo .................... G01N 25/18
374/29
4,916,715 A * 4/1990 Adiutori ................ G01K 17/20
374/1

(Continued)

FOREIGN PATENT DOCUMENTS

FR      2 528 172 A1    12/1983
WO    2011/117356 A1    9/2011
WO    2012/028829 A1    3/2012

OTHER PUBLICATIONS

International Search Report dated May 2, 2016 in PCT/FR2016/050253 filed Feb. 5, 2016.

*Primary Examiner* — Stephanie E Bloss
(74) *Attorney, Agent, or Firm* — Oblon, McClelland, Maier & Neustadt, L.L.P.

(57) ABSTRACT

A method for determining a quantity representative of the thermal resistance of a dividing wall between a first environment and a second environment, including, over at least two successive time periods $D_k$ corresponding to distinct heating powers $P_k$ of the first environment, measuring the heat flow rate through the wall $q_k$ and the temperature in the first environment $T_{1k}$ and determining the temperature in the second environment $T_{2k}$, at closely spaced time intervals; the quantity representative of the thermal resistance of the wall being determined by bringing into convergence: a thermal model expressing the temporal variation of a temperature in one environment divided off from another environment by a wall, as a function of the heat flow rats: through the wall, the temperature in the other environment, and physical parameters of the wall; and the measured evolution $T_{1k}(t)$ of the temperature in the first environment over time.

23 Claims, 3 Drawing Sheets

(56) References Cited

U.S. PATENT DOCUMENTS

| | | | | |
|---|---|---|---|---|
| 5,112,136 | A * | 5/1992 | Sakuma | G01N 25/18 |
| | | | | 374/110 |
| 5,258,929 | A * | 11/1993 | Tsuchida | G01N 25/18 |
| | | | | 374/44 |
| 5,833,365 | A * | 11/1998 | Stals | G01R 31/286 |
| | | | | 374/5 |
| 7,246,939 | B1 * | 7/2007 | Gultekin | G01N 24/08 |
| | | | | 324/307 |
| 10,481,019 | B2 * | 11/2019 | Pandraud | G01K 17/20 |
| 2012/0330626 | A1 * | 12/2012 | An | G01K 17/20 |
| | | | | 703/2 |
| 2013/0226503 | A1 * | 8/2013 | Mangematin | G01K 17/20 |
| | | | | 702/136 |
| 2018/0314782 | A1 * | 11/2018 | Proulx | G06F 30/367 |
| 2019/0275527 | A1 * | 9/2019 | Hayes | G05D 23/193 |

* cited by examiner

DETERMINATION OF THE THERMAL RESISTANCE OF A WALL

FIELD OF THE INVENTION

The present invention relates to a method and a device for determining a quantity representative of the thermal resistance of a dividing wall between a first environment and a second environment.

The invention can be applied to determine a quantity representative of the thermal resistance of any type of dividing wall between two environments, especially a wall of a building, a wall of a vehicle, a wall of a furnace, a wall of a tank.

SUMMARY OF THE INVENTION

In particular, the invention can be applied to determine a quantity representative of the thermal resistance of a construction element belonging to the envelope of a premises, such as a wall, a floor, a roof, a window, a door, etc., the construction element then being a dividing wall between the interior and the exterior of the premises.

Here, "premises" is intended to mean any living or storage space. In particular, it may be a fixed living or storage space, such as an individual house or a building, in particular for residential or tertiary use, or a part of such a building, for example an apartment in a building with multiple floors, or else such as a machine, in particular in the electro-domestic sector, an oven, a refrigerator, etc. It may also be a transportable living or storage space, such as a train carriage, a car cabin, a truck cab or a storage space in a truck, a ship cabin or a storage space in a ship.

Within the framework of the invention, the expression "quantity representative of the thermal resistance of a wall" designates any quantity characterizing the ability of the wall to allow through a heat flow. Within the framework of the method and of the device according to the invention, it is in particular possible to determine, as quantities representative of the thermal resistance of the wall:
- the thermal transmittance of the wall, denoted U;
- the total thermal resistance of the wall, denoted $R_T$;
- the thermal resistance from surface to surface of the wall, denoted R.

The thermal transmittance U of a wall is defined as the quotient of the heat flow rate per unit surface area, in the steady state, by the temperature difference between the environments situated on either side of the wall. The thermal transmittance U is given by the relation:

$$U = \frac{q}{(T_1 - T_2)},$$

where q is the density of heat flow rate through the wall, $T_1$ is the temperature in the environment situated on a first side of the wall, $T_2$ is the temperature in the environment situated on the second side of the wall.

The total thermal resistance $R_T$ of the wall is such that $$R_T = \frac{1}{U} = R_{s1} + R + R_{s2}, \text{ where } R = \frac{T_{s1} - T_{s2}}{q}$$

is the thermal resistance from surface to surface of the wall, with $T_{s1}$ the surface temperature of the first side of the wall and $T_{s2}$ the surface temperature of the second side of the wall, $R_{s1}$ is the surface thermal resistance of the first side of the wall, $R_{s2}$ is the surface thermal resistance of the second side of the wall.

The determination of the thermal transmittance U of the constituent construction elements of the envelope of a premises is useful, in particular, to perform a diagnosis of the thermal insulation of the premises, whether a new or old premises. In particular, when a refurbishment of the premises is considered, it makes it possible to target the measures that ought to be taken to improve thermal performance.

It is known to determine the thermal transmittance U of a construction element belonging to the envelope of a premises according to a quasi-static method defined by ISO standard 9869:1994, termed the "heat flow meter method". This method involves in situ measurements, on the one hand, of the heat flow rate through the construction element with the aid of at least one heat flow meter mounted on a face of the element which is adjacent to the most stable temperature and, on the other hand, of the temperature inside the premises and of the temperature outside the premises in the vicinity of the heat flow meter. The measurements of heat flow rate and of temperatures are carried out during a time period that may range from three days minimum to several weeks, the duration of measurement depending, in particular, on the nature of the construction element, the fluctuations of the interior and outside temperatures, the method used for the data analysis. A major drawback of this method is its duration of implementation.

It is these drawbacks that the invention is more particularly intended to remedy by proposing a method and a device making it possible to determine in a fast manner a quantity representative of the thermal resistance of a dividing wall between a first environment and a second environment, in particular over a period of a single night or even of a few hours, whatever the type of wall, with moderate cost and reasonable accuracy, the wall being able for example to be a construction element belonging to the envelope of a premises.

For this purpose, one subject of the invention is a method for determining a quantity representative of the thermal resistance of a dividing wall between a first environment and a second environment, characterized in that it comprises steps in which:
- over at least two successive time periods $D_k$ corresponding to distinct heating powers $P_k$ of the first environment, a campaign of measurements of the heat flow rate through the wall $q_k$ and of the temperature in the first environment $T_{1k}$ at closely spaced time intervals is undertaken, as well as the determination of the temperature in the second environment $T_{2k}$ at closely spaced time intervals;
- the value of the quantity representative of the thermal resistance of the wall is determined by bringing into convergence: on the one hand, a thermal model expressing the temporal variation of the temperature in one environment divided off from another environment by a wall, as a function of the heat flow rate through the wall, of the temperature in the other environment and of physical parameters of the wall, on the basis of which the quantity representative of the thermal resistance of the wall is calculable; and, on the other hand, the measured evolution $T_{1k}(t)$ of the temperature in the first environment as a function of time.

Within the meaning of the invention, the fact of bringing the thermal model and the measured evolution $T_{1k}(t)$ into convergence signifies that the value of physical parameters of the wall that are used in the thermal model is adjusted so as to minimize the difference, at least over a time interval included in each time period $D_k$, between the temporal evolution of the temperature in the first environment calculated on the basis of the thermal model and the temporal evolution of the temperature actually measured in the first environment $T_{1k}(t)$. The fitting can thus be done over the whole of the extent of each time period $D_k$, or over one or more time intervals included in each time period $D_k$.

By way of example, in the case where the thermal model is a simple R-C model with one resistor and one capacitor and where, for each time period $D_k$, there exists a time interval $\Delta t_k$ for which the measured evolution $T_{1k}(t)$ of the temperature in the first environment as a function of time is substantially linear, the simple R-C model and the measured evolution $T_{1k}(t)$ are made to converge over the time intervals $\Delta t_k$ in the following manner: for each time period $D_k$, the slope $a_k$ of the tangent to the curve $T_{1k}(t)$ is determined over the time interval $\Delta t_k$, and the value of the quantity representative of the thermal resistance of the wall is determined on the basis of the values of slope $a_k$ and of the values of mean heat flow rate through the wall $q_{km}$ taken over the time period $D_k$ or, preferably, taken over the time interval $\Delta t_k$.

According to another example, in the case where the thermal model is a more complex R-C model, such as a so-called "2R2C" model with two resistors and two capacitors, or else a so-called "3R2C" model with three resistors and two capacitors, the more complex R-C model and the measured evolution $T_{1k}(t)$ are made to converge by adjusting the value of the wall's physical parameters used in the model so as to minimize the difference, over all of the time periods $D_k$, between the temporal evolution of the temperature in the first environment calculated on the basis of the more complex R-C model and the temporal evolution of the temperature actually measured in the first environment $T_{1k}(t)$.

In practice, input data are fed into the thermal model, such as the dimensions of the wall, the heat flow rate through the wall $q_k$ measured over each time period $D_k$, the temperature in the second environment $T_{2k}$ determined over each time period $D_k$.

Examples of physical parameters of the wall that are liable to intervene in the thermal model and to be adjusted so as to make the thermal model and the measured evolution $T_{1k}(t)$ converge comprise, in particular, the thermal conductivity of the wall, the thermal capacity of the wall, the thickness of the wall, the coefficient of convecto-radiative exchange $h_i$ between the wall and the first environment.

The invention allows in situ determination of the thermal resistance of the wall. The principle underlying the invention is to use the transient variations of the temperature in the first environment when the first environment is subjected to controlled internal impulses and in measured external surroundings. The quantitative analysis of the variation of the temperature in the first environment makes it possible to quantitatively determine the energy efficiency of the wall over a short period, extending over a few hours, while limiting the number of parameters liable to influence the thermal behaviour of the wall and of the first and second environments. In particular, in the case of the determination of the thermal resistance of a construction element belonging to the envelope of a premises, the brevity of the measurements makes it possible to circumvent the influence of the conditions of use of the premises and of the variations of the exterior climatic conditions.

Preferably, the variation of the temperature in the first environment is analysed in the vicinity of the wall of which a quantity representative of the thermal resistance is to be determined.

Within the framework of the invention, "heating power of the first environment" is intended to mean any operative condition generating a variation of the temperature in the first environment, for given temperature conditions in the second environment. It is understood that the heating power may be positive, zero or negative. A positive heating power corresponds to a supply of heat into the first environment, whereas a negative heating power corresponds to a supply of cold into the first environment.

The time periods $D_k$ may be either disjoint, or immediately successive to one another. In the latter case, it may be considered that the method is carried out in its entirety over a continuous time period, formed by the succession of the time periods $D_k$.

Preferably, the method is implemented with two successive time periods $D_1$ and $D_2$ corresponding to two distinct heating power settings $P_1$ and $P_2$ of the first environment.

In an advantageous manner, with a view to limiting the implementation time of the method while reducing the contribution of the solar radiation, the method is carried out in its entirety continuously over a single nocturnal period.

According to one aspect of the invention, the measurements of the heat flow rate through the wall $q_k$ are performed with the aid of at least one heat flow sensor positioned on a face of the wall. The heat flow sensor may be a heat flow meter or a calorimeter.

In an advantageous manner, the heat flow sensor is a heat flow meter compatible with ISO standard 9869:1994, in particular a gradient heat flow meter.

According to one aspect of the invention, the flow resistance due to the heat flow meter is taken into account and a correction is applied to the measured heat flow rate, so as to obtain the heat flow rate relating only to the wall of which the thermal resistance is to be determined. This is particularly important for walls with low thermal resistance, such as single glazings.

In an advantageous manner, the measurements of the temperature in the first environment $T_{1k}$ are performed with the aid of at least one temperature sensor which is positioned in the first environment in the vicinity of the heat flow sensor. Preferably, the positioning of the temperature sensor or sensors in the first environment is carried out in accordance with paragraph 6.1.3 of ISO standard 9869:1994.

According to one aspect of the invention, the measurements of the temperature in the first environment $T_{1k}$ are performed with the aid of at least one ambient temperature sensor able to measure the temperature of the air in the first environment. It is then possible to access the thermal transmittance U of the wall or the total thermal resistance $R_T$ of the wall directly. Examples of ambient temperature sensors that can be used within the framework of the invention comprise, in particular, thermocouples, for example Type K or Type T thermocouples; resistance thermometers, for example Pt100 sensors. Such ambient temperature sensors are positioned in the air volume in the first environment.

According to one aspect of the invention, the measurements of the temperature in the first environment $T_{1k}$ are performed with the aid of at least one surface temperature sensor able to measure the surface temperature of the wall in the first environment. It is then possible to access the thermal resistance from surface to surface R of the wall directly. Examples of surface temperature sensors that can be used within the framework of the invention comprise, in particular, thin thermocouples or flat resistance thermometers, which are positioned on the surface of the wall in the first environment; infrared cameras, which are positioned facing the surface of the wall in the first environment.

The thermal model used to determine the value of the quantity representative of the thermal resistance of the wall can be of any type known to the person skilled in the art. It may be, especially, an R-C model with a suitable number of resistors and capacitors.

Preferably, the thermal model used to determine the value of the quantity representative of the thermal resistance of the wall is a simple R-C model with one resistor and one capacitor.

According to a variant, the thermal model used to determine the value of the quantity representative of the thermal resistance of the wall can be a so-called "2R2C" R-C model with two resistors and two capacitors, or else a so-called "3R2C" R-C model with three resistors and two capacitors.

In an advantageous embodiment, the thermal model used to determine the value of the quantity representative of the thermal resistance of the wall is a simple R-C model with one resistor and one capacitor and, for each time period $D_k$, there exists a time interval $\Delta t_k$ for which the measured evolution $T_{1k}(t)$ of the temperature in the first environment as a function of time is substantially linear. The R-C model and the measured evolution $T_{1k}(t)$ are then made to converge in the following manner: for each time period $D_k$, the slope $a_k$ of the tangent to the curve $T_{1k}(t)$ is determined over the time interval $\Delta t_k$, and then the value of the quantity representative of the thermal resistance of the wall is determined on the basis of the values of slope $a_k$ and of the values of mean heat flow rate through the wall $q_{km}$, taken over the time period $D_k$ or, preferably, taken over the time interval $\Delta t_k$.

Of course, the method according to the invention does not necessarily require the setting up of a graphical representation of the evolution $T_{1k}(t)$.

In particular, over each time interval $\Delta t_k$, the slope $a_k$ of the tangent to the curve $T_{1k}(t)$ is equal to the derivative of the evolution $T_{1k}(t)$ over the interval $\Delta t_k$. Hence, the step of determining the slope $a_k$ of the tangent to the curve $T_{1k}(t)$ over the time interval $\Delta t_k$ can be carried out, within the framework of the invention, by calculating the derivative of the evolution $T_{1k}(t)$ over the time interval $\Delta t_k$, without resorting to a graphical representation of the evolution $T_{1k}(t)$.

The calculation steps of the method, in particular for the determination of the slopes $a_k$, can be implemented with the aid of any appropriate calculation means. It may be in particular an electronic calculation unit which is connected to an acquisition system for acquiring the measurements required by the method and which comprises calculation means for executing all or part of the calculation steps of the method on the basis of the acquired measurements.

Within the framework of the invention, according to the principle explained in patent application WO 2012/028829 A1, a simple R-C model is used to describe a premises, with two homogeneous temperature nodes, one inside the premises and the other outside the premises, which are separated by a resistor representing the overall heat loss coefficient K of the premises and describing the loss by transmission and infiltration through the envelope of the premises. The temperature node inside the premises is linked to a capacitor which represents the thermal mass or effective heat capacity C of the premises. The power fed into the premises is compensated by the heat loss through the envelope and the heat stored up in the structure of the envelope, this being described by the equation:

$$P = K(T_1 - T_2) + C\frac{dT_1}{dt},$$

where P is the total power fed into the premises, $T_1$ and $T_2$ are respectively the temperature inside the premises and the outside temperature, K is the overall heat loss coefficient of the premises and C is the effective heat capacity of the premises.

It is assumed that the temperature response of the premises is a simple decreasing exponential and that its time constant is the product of the overall heat loss coefficient K and of the effective heat capacity C of the premises. In reality, the thermal response of the premises is more complex and is the superposition of a large number of decreasing exponentials, but by performing a test over a sufficiently long period, only the largest time constant plays a role and the previously described model is valid.

By applying two heating powers $P_1$ and $P_2$ of the premises of different values over two time periods $D_1$ and $D_2$, it is then possible to determine the overall heat loss coefficient K of the premises according to the formula:

$$K = \frac{a_1 P_2 - a_2 P_1}{a_1 \Delta T_{2m} - a_2 \Delta T_{1m}},$$

where $(a_k)_{k=1 \, or \, 2}$ is the slope over the time interval $\Delta t_k$ of the tangent to the evolution curve of the temperature inside the premises $T_{1k}(t)$, and $(\Delta T_{km})_{k=1 \, or \, 2}$ is the difference between the average temperature inside the premises and the average temperature outside the premises over the time interval $\Delta t_k$.

According to the present invention, by analogy, it is possible to determine the thermal transmittance U of a dividing wall between a first environment and a second environment according to the formula:

$$U = \frac{a_1 q_2 - a_2 q_1}{a_1 \Delta T_{2m} - a_2 \Delta T_{1m}},$$

where $(a_k)_{k=1 \, or \, 2}$ is the slope over the time interval $\Delta t_k$ of the tangent to the evolution curve of the temperature in the first environment $T_{1k}(t)$, $(\Delta T_{km})_{k=1 \, or \, 2}$ is the difference between the average temperature in the first environment and the average temperature in the second environment over the time interval $\Delta t_k$, and $(q_k)_{k=1 \, or \, 2}$ is the mean heat flow rate through the wall taken over the time period $D_k$ or, preferably and for greater accuracy, taken over the time interval $\Delta t_k$.

According to one embodiment, the method comprises calculation steps in which:

there is undertaken, over two successive time periods $D_1$ and $D_2$:

i. over the first time period $D_1$, the application of a first heating power $P_1$ of the first environment, and a campaign of measurements of the heat flow rate through the wall $q_1$ and of the temperature in the first environment $T_{11}$ at closely spaced time intervals, as well as the determination of the temperature in the second environment $T_{21}$ at closely spaced time intervals, the first heating power $P_1$ being such that the parameter $$\alpha = 1 - \frac{\Delta T_1(0) K_{ref}}{P_1}$$

is less than or equal to 0.8, with $\Delta T_1(0)=T_{11}(t=0)-T_{2m}$, where t=0 is the start point of the first time period $D_1$, $T_{2m}$, is the average temperature in the second environment over all of the time periods $D_1$ and $D_2$, and $K_{ref}$ is a reference value of the heat loss coefficient K of the first environment, and then ii. over the second time period $D_2$, the application of a substantially zero second heating power $P_2$ of the first environment, and a campaign of measurements of the heat flow rate through the wall $q_2$ and of the temperature in the first environment $T_{12}$ at closely spaced time intervals, as well as the determination of the temperature in the second environment $T_{22}$ at closely spaced time intervals;

the value of the quantity representative of the thermal resistance of the wall is determined by bringing into convergence: on the one hand, a thermal model expressing the temporal variation of the temperature in one environment divided off from another environment by a wall, as a function of the heat flow rate through the wall, of the temperature in the other environment and of physical parameters of the wall, on the basis of which the quantity representative of the thermal resistance of the wall is calculable; and, on the other hand, the measured evolution $T_{1k}(t)$ of the temperature in the first environment as a function of time.

In this embodiment, a specific thermal loading of the first environment is selected, which makes it possible to access the value of the quantity representative of the thermal resistance of the wall with good accuracy and over a reduced time, this specific thermal loading being the application of a strictly positive or strictly negative first heating power $P_1$ suitable for generating a forced evolution of the temperature in the first environment, followed by the application of a substantially zero second heating power $P_2$ permitting free evolution of the temperature in the first environment.

Preferably, the first heating power P is such that the parameter $$\alpha = 1 - \frac{\Delta T_1(0)K_{ref}}{P_1}$$

is greater than or equal to 0.25, more preferably greater than or equal to 0.3. Indeed, for well insulated environments, when the parameter $\alpha$ is less than 0.25 or 0.3, the sensitivity of conventional measurement sensors does not make it possible to obtain satisfactory data relating to the evolution of the temperature in the first environment T over the first time period $D_1$, resulting in an increase in the uncertainty in the value of the coefficients U, R or K determined according to the invention.

The determination of the value of the first heating power $P_1$ to be applied over the first time period $D_1$ in order to satisfy the criteria on the parameter $\alpha$ makes it necessary to know a reference value $K_{ref}$ of the heat loss coefficient K of the first environment.

A first method for accessing a reference value $K_{ref}$ of the heat loss coefficient K of the first environment is the use of a quantity arising from a thermal analysis of the first environment. In particular, when the first environment is the interior of a premises, the reference value $K_{ref}$ of the premises can be obtained on the basis of the coefficient of transmission or of heat transfer of the envelope of the premises. Preferably, the heat transfer coefficient H of the envelope of the premises is determined using ISO standard 13789:2007, "Thermal performance of buildings—Transmission and ventilation heat transfer coefficients—Calculation method", then the reference value $K_{ref}$ of the heat loss coefficient is deduced through the relation:

$K_{ref}=H_T+H_V$, where $H_T$ is the transmission heat transfer coefficient and $H_V$ is the ventilation heat transfer coefficient. Preferably, the heat transfer coefficient of the envelope of the premises is determined according to ISO standard 13789:2007 in the absence of ventilation in the premises. As a variant, the ventilation may be active in the premises, the ventilation flow rate then having to be measured or estimated.

The use of ISO standard 13789:2007 is a preferred method for accessing a reference value $K_{ref}$ of the heat loss coefficient K. However, other methods can also be considered, in particular when not all of the information necessary to apply ISO standard 13789:2007 is available.

A second method for accessing a reference value $K_{ref}$ of the heat loss coefficient K of the first environment in the case of the interior of a premises is to subject the premises to a quasi-static test, such as a "coheating" test.

"Coheating" is a quasi-static method whose objective is to measure the total heat loss of an unoccupied premises. A "coheating" test involves heating the premises for several days, generally for one to three weeks, at a constant and homogeneous temperature, by virtue of electric radiators coupled to fans and connected to a regulation system. The temperature setting must be sufficiently high, of the order of 25° C., so as to have a temperature difference between the interior of the premises and the exterior of at least 10° C. When saturation is reached, that is to say when a quasi-static state is reached, the power P necessary to maintain the premises at a temperature of 25° C., the interior temperature $T_{int}$ and the outside temperature $T_{ext}$ are measured. The interior temperature $T_{int}$ can, in particular, be measured with the aid of thermocouples or thermistors, while the outside temperature $T_{ext}$ can be measured by virtue of a meteorological station. The processing of the data then makes it possible to obtain a value $K_{ref}$ of the heat loss coefficient.

More precisely, the procedure is as follows:

To begin, a first pressurization test takes place, which makes it possible to measure the losses due to ventilation and to infiltrations.

Thereafter, the openings such as the chimneys or the air vents are closed, so that ventilation related losses are no longer accessible to the measurement.

The premises is then heated electrically and in a homogeneous manner, until a high temperature setting, of the order of 25° C., is reached.

The power P, the interior temperature $T_{int}$ and the outside temperature $T_{ext}$ are then measured. The processing of these measurements affords access to the losses by transmission and by infiltration.

Finally, a second pressurization test is carried out, so as to determine the heat losses due to infiltrations alone, the openings of the premises being kept closed.

For the processing of the measurements, the average of the power necessary to maintain the premises at the temperature setting and the average of the temperature difference between the interior and the exterior are determined each day, over twenty-four hours. These averaged data are then plotted on a chart giving the power as a function of the temperature difference. A correction, due to solar radiation which also participates in the heating of the premises, has to be made. The slope of the straight line which passes through the origin is given by linear regression, it corresponds to the heat loss coefficient $K_{ref}$.

This "coheating" method is relatively simple to implement and provides directly a reference value $K_{ref}$ of the heat loss coefficient K of the premises. According to an advantageous variant, for premises with very low thermal inertia, it is possible to carry out "coheating" tests at night, the correction due to solar contributions then not having to be made.

A third method for accessing a reference value $K_{ref}$ of the heat loss coefficient K of the first environment in the case of the interior of a premises is the use of a quantity arising from a study of the energy consumption of the premises. In particular, the reference value $K_{ref}$ can be determined as being the ratio of the energy consumed by the premises over a given time period to the product of the duration of the given time period and of the average temperature difference between the interior and the exterior of the premises over the given time period.

When the thermal model used to determine the value of the quantity representative of the thermal resistance of the wall is an R-C model with one resistor and one capacitor, for each of the first and second time periods $D_1$ and $D_2$, a time interval $\Delta t_1$ or $\Delta t_2$ is selected for which the evolution $T_{11}(t)$ or $T_2(t)$ is substantially linear, where the time intervals $\Delta t_1$ and $\Delta t_2$ are such that the time interval $\Delta t_1$ extends up to the end of the first period $D_1$ of application of the first heating power $P_1$ and such that, when the start points of the first period $D_1$ and of the second period $D_2$ are superimposed, the time intervals $\Delta t_1$ and $\Delta t_2$ have the same end point; the slope $a_1$ or $a_2$ of the tangent to the curve $(T_{1k}(t))_{k=1 \ or \ 2}$ is determined over each time interval $\Delta t_1$ or $\Delta t_2$; and the value of the quantity representative of the thermal resistance of the wall is deduced on the basis of the values of slope $a_1$, $a_2$ and of the values of mean heat flow rate through the wall $q_{1m}$, $q_{2m}$. Each value of mean heat flow rate through the wall $q_{km}$ can be taken over the corresponding time period $D_k$ or, preferably and for more accuracy, taken over the corresponding time interval $\Delta t_k$.

Preferably, the time intervals $\Delta t_1$ and $\Delta t_2$ have the same duration.

In an advantageous manner, for each time period $D_k$, the heating power $P_k$ of the first environment comprises a heating power $P_{impk}$ imposed by means of a controlled power source.

The controlled power source for the heating of the first environment can be a fixed item of equipment of the first environment, that is to say a heating means installed in the first environment independently of the implementation of the method, provided that this heating means has low inertia and can be adjusted so as to ensure fast heating of the first environment. It may in particular be a heat pump whose coefficient of performance (COP) is known.

As a variant, the controlled power source for the heating of the first environment can be a source brought into the first environment specifically for the implementation of the method.

According to another variant, the heating of the first environment on each time period can be implemented using a combination of at least one heating element fixedly provided in the first environment, independently of the implementation of the method, and at least one heating element brought into the first environment specifically for the implementation of the method.

The heating elements of the first environment can be of convective, conductive or radiative type, or combine several of these technologies. Preferably, the heating elements are electrical appliances, thereby making it possible to determine the heating power in a direct and accurate manner.

Examples of electrical heating appliances comprise in particular appliances of convective type involving the blowing of air heated by means of electrical resistors; heating mats or films; parasol radiant heaters. As a variant, the heating elements can be gas- or fuel oil-operated appliances, provided that the efficiencies of the burners and the fuel flow rates can be estimated in a sufficiently accurate manner to access the heating power.

In an advantageous embodiment, the heating elements of the first environment are electric heating mats that are distributed in the first environment by positioning them vertically and rolled up, so that the whole of the thermal power is dissipated in the air in the first environment. This arrangement allows fast and homogeneous heating of the first environment, ensuring that the ambient temperature is sufficiently close to the surface temperature of the wall on the side of the first environment. According to a variant, the heating elements of the first environment are small electric convectors distributed in the first environment.

If the method of the invention is implemented with a first environment comprising internal partitions which delimit several rooms or regions of the first environment, the temperature can be measured in several rooms or areas of the first environment and the temperature in the first environment at each time t can be considered as the average of the temperature measurements obtained at time t in the different rooms or regions of the first environment each weighted by the volume of the room or region.

According to one aspect of the invention, the heating power supplied in the first environment is measured using at least one power sensor. The or each power sensor may be a voltage sensor (voltmeter) and/or a current sensor (ammeter). Preferably, the or each power sensor is a power meter, provided both with a voltage sensor and a current sensor. This allows an accurate measurement of the power in the first environment, while avoiding potential fluctuations in the mains voltage or the determination of the resistance of the or each heating element.

According to one aspect of the invention, the method is implemented so as to determine, on the basis of one and the same thermal loading of the first environment, the thermal transmittance U of several construction elements belonging to the envelope of one and the same premises, where each construction element is a dividing wall between a first environment which is the interior of the premises and a second environment which is the exterior of the premises. In an advantageous manner, the campaigns of measurements of the heat flow rate $q_k$ through the various construction elements and of the interior temperature $T_{1k}$ are then made over the same time periods $D_k$ for all the construction elements of the envelope, corresponding to the same distinct heating powers $P_k$ of the premises. It is thus possible to access the thermal transmittances U of the various constituent construction elements of the envelope of a premises during one and the same test. The obtaining of the thermal transmittances U of the various constituent construction elements of the envelope of a premises is useful, in particular, to perform a diagnosis of the thermal insulation of the premises.

According to an advantageous aspect, the overall heat loss coefficient K of the premises is also determined. This makes it possible to access the relative contributions of the various constituent construction elements of the envelope of the premises to the total heat loss of the premises, and thus to target the measures that should be taken to improve thermal performance.

In one embodiment, the overall heat loss coefficient K of the premises is determined in the following manner:

there is undertaken, over each of the said time periods $D_k$, a campaign of measurements of at least one temperature inside the premises at closely spaced time intervals and the determination of the temperature of the outside air at closely spaced time intervals;

the value of the heat loss coefficient K of the premises is determined by bringing into convergence:
- a thermal model expressing the temporal variation of the temperature inside a premises as a function of the heating power applied in the premises, of the temperature of the outside air and of physical parameters of the premises, on the basis of which the heat loss coefficient of the premises is calculable, on the one hand, and
- the measured evolution of the temperature inside the premises as a function of time, on the other hand.

In an advantageous manner, the campaigns of measurements of the heat flow rate $q_k$ through the various constituent construction elements of the envelope of the premises and of the interior temperature of the premises $T_{1k}$ are done over the same time periods $D_k$, corresponding to the same distinct heating powers $P_k$ of the premises. It is thus possible to have access during one and the same test, that is to say on the basis of one and the same thermal loading of the first environment which is the interior of the premises, at the same time to the thermal transmittances U of the various constituent construction elements of the envelope of the premises and to the overall heat loss coefficient K of the premises.

As described previously, the invention proposes to impose distinct heating powers $P_k$ of the first environment over at least two successive time periods $D_k$ and to measure for each time period $D_k$ the temporal evolution of the temperature in the first environment $T_{1k}$ (t).

As a variant, it is also possible to impose distinct temperatures $T_{1k}$ in the first environment over at least two successive time periods $D_k$ and to measure for each time period $D_k$ the temporal evolution of the power in the first environment $P_k$ (t).

According to this variant, one subject of the invention is a method for determining a quantity representative of the thermal resistance of a dividing wall between a first environment and a second environment, comprising steps in which:

over at least two successive time periods $D_k$ corresponding to distinct temperatures $T_{1k}$ applied in the first environment, a campaign of measurements of the heat flow rate through the wall $q_k$ and of the power in the first environment $P_k$ at closely spaced time intervals is undertaken, as well as the determination of the temperature in the second environment $T_{2k}$ at closely spaced time intervals;

the value of the quantity representative of the thermal resistance of the wall is determined by bringing into convergence: on the one hand, a thermal model expressing the temporal variation of the power in one environment divided off from another environment by a wall, as a function of the heat flow rate through the wall, of the temperature in the other environment and of physical parameters of the wall, on the basis of which the quantity representative of the thermal resistance of the wall is calculable; and, on the other hand, the measured evolution $P_k(t)$ of the power in the first environment as a function of time.

Preferably, the method is implemented with two successive time periods $D_1$ and $D_2$ corresponding to two distinct temperature settings $T_{11}$ and $T_{12}$ applied in the first environment.

Another aspect of the invention, which may be considered independently of the determination of a quantity representative of the thermal resistance of a dividing wall between a first environment and a second environment, is a method for determining the overall heat loss coefficient K of a premises, comprising steps in which:

over at least two successive time periods $D_k$ corresponding to distinct temperatures $T_{1k}$ applied in the premises, a campaign of measurements of the power in the premises $P_k$ at closely spaced time intervals is undertaken, as well as the determination of the temperature of the outside air at closely spaced time intervals;

the value of the heat loss coefficient K of the premises is determined by bringing into convergence: on the one hand, a thermal model expressing the temporal variation of the power in a premises as a function of the temperature applied in the premises, of the temperature of the outside air and of physical parameters of the premises, on the basis of which the heat loss coefficient of the premises is calculable; and, on the other hand, the measured evolution $P_k$ (t) of the power in the premises as a function of time.

Preferably, the method is implemented with two successive time periods $D_1$ and $D_2$ corresponding to two distinct temperature settings $T_{11}$ and $T_{12}$ applied in the premises.

One subject of the invention is also an information recording medium, comprising instructions for the implementation of all or part of the calculation steps of a method as described previously, when these instructions are executed by an electronic calculation unit.

Another subject of the invention is a device for the implementation of a method as described previously, comprising:
- at least one heating element comprising a controlled power source;
- at least one heat flow sensor intended to be positioned on a face of the wall so as to measure the heat flow rate through the wall;
- at least one temperature sensor intended to measure the temperature in the first environment $T_{1k}$ in the vicinity of the heat flow sensor;
- an electronic calculation unit;
- an information recording medium comprising instructions, intended to be executed by the electronic calculation unit, for the implementation of all or part of the calculation steps of the method.

According to an advantageous feature, the or each heating element heats the air in the first environment. This allows fast heating of the first environment. Such is the case in particular with a plurality of electric convectors distributed in the first environment, or with electric heating mats as described previously, which are disposed vertically in the first environment and rolled up, so that the whole of the thermal power is dissipated in the air.

According to one aspect of the invention, the temperature sensor or sensors comprise at least one ambient temperature sensor intended to be positioned in the air volume in the first environment.

According to one aspect of the invention, the temperature sensor or sensors comprise at least one surface temperature sensor intended to be positioned on, or facing, the surface of the wall in the first environment.

In an advantageous manner, the electronic calculation unit comprises means of control of the power source of the or of each heating element.

In one embodiment, the device comprises at least one box, comprising both a heat flow sensor and a temperature sensor, and connection means, especially wireless, between the box and the electronic calculation unit.

BRIEF DESCRIPTION OF THE DRAWINGS

The features and advantages of the invention will become apparent in the description which follows of an embodiment of a method and of a device according to the invention, given solely by way of example and while referring to the appended figures in which.

Figure 1:
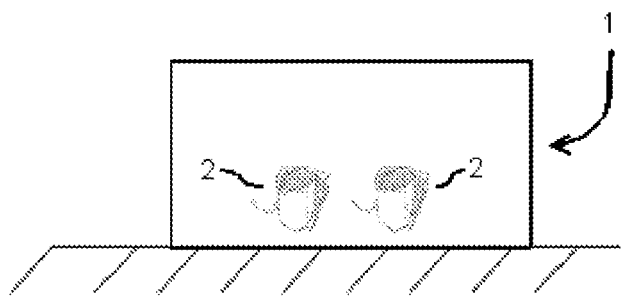
FIG. 1 is a schematic view of a bungalow whose envelope comprises several construction elements, namely a floor, a ceiling, a wall with a door (considered to form part of the wall), a set of two glazings, where one wishes to determine the thermal transmittance U of each of these elements in accordance with the invention.
Figure 4:
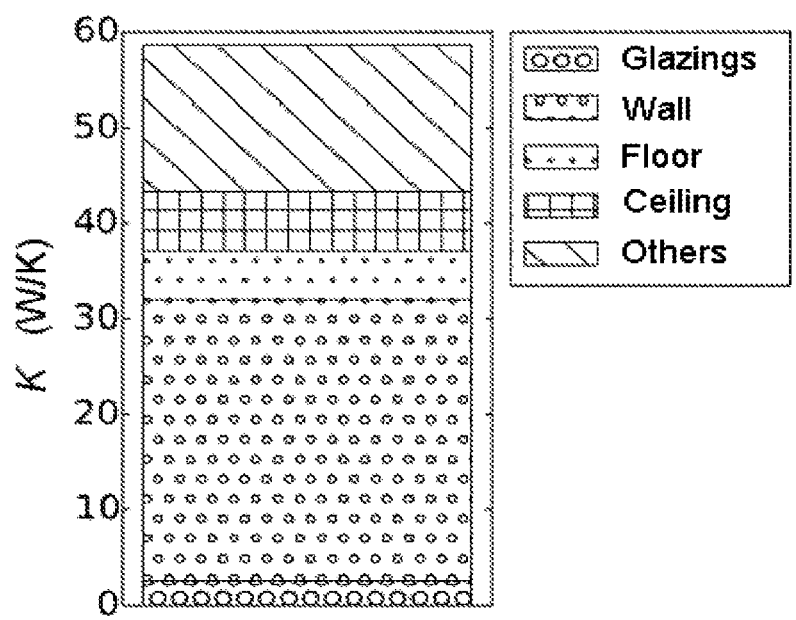
Figure 2:
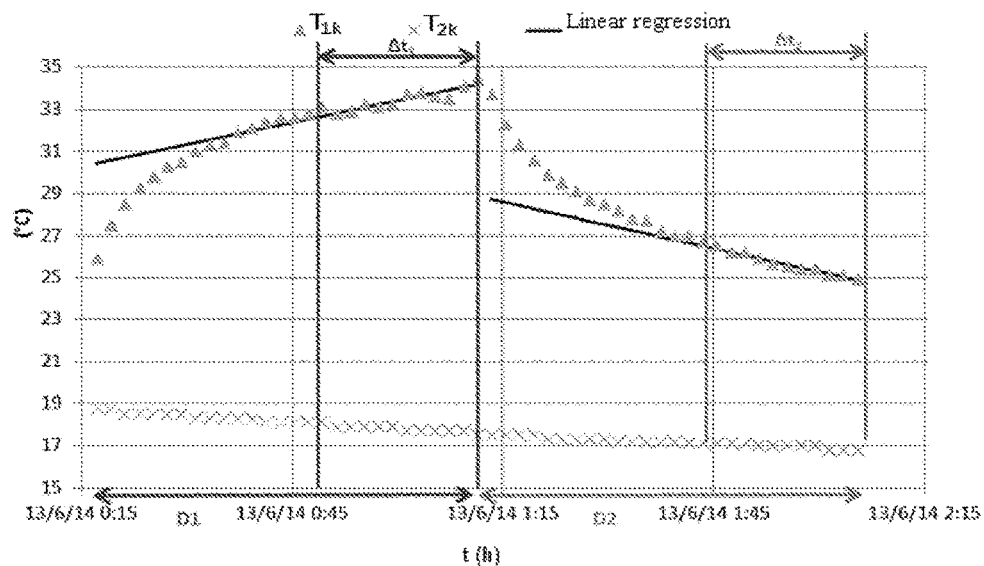
FIGS. 2 and 3 are graphs showing, for one of the glazings belonging to the envelope of the bungalow of FIG. 1, respectively the evolution of the interior temperature $T_{1k}$ as a function of time t, as measured by an air temperature sensor situated in the vicinity of a heat flow meter fixed on the glazing, and the evolution of the heat flow rate per unit area through the glazing $q_k$ as a function of time, as measured by the aforementioned heat flow meter fixed on the glazing, in the course of the implementation of the method in accordance with the invention comprising a first time period $D_1$ in the course of which a first heating power $P_1$ is applied in the bungalow, where $P_1$ is such that the parameter $$\alpha = 1 - \frac{\Delta T_1(0) K_{ref}}{P_1}$$
Figure 5:
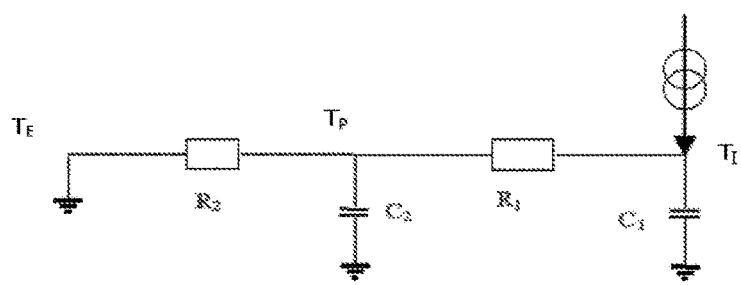
Figure 6:
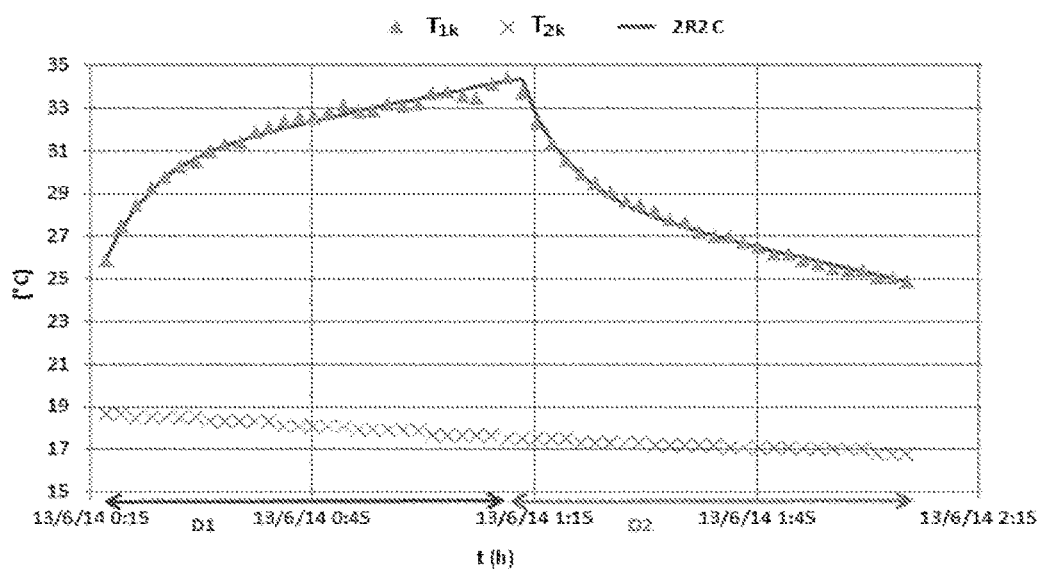

of the bungalow lies between 0.3 and 0.8, followed by a second time period $D_2$ in the course of which a substantially zero second heating power $P_2$ is applied in the bungalow, so as to leave the bungalow to cool freely, the evolution of the outside temperature $T_{2k}$ also being shown in these figures;

FIG. 4 is a graph showing the distribution of the relative contributions of the various constituent construction elements of the envelope of the bungalow of FIG. 1 to the total heat loss of the bungalow;

FIG. 5 is a diagram of a so-called "2R2C" model of the bungalow of FIG. 1, with two resistors and two capacitors;

FIG. 6 is a graph illustrating the fitting of the 2R2C model shown in FIG. 5 to the evolution of the interior temperature $T_{1k}$ as a function of time t shown in FIG. 2, obtained by making the 2R2C model and the measured evolution $T_{1k}(t)$ converge over all of the two time periods $D_1$ and $D_2$.

DETAILED DESCRIPTION OF THE INVENTION

The method according to the invention is implemented for the determination of the thermal transmittance U of several constituent construction elements of the envelope of the bungalow 1 represented in FIG. 1, namely the floor, the ceiling, the wall, and the set of glazings of the bungalow.

The bungalow 1 exhibits a floor area of 13.5 m², a glazings area of 3.9 m=, an interior height of 2.5 m, a volume of 34.2 m³ and a total envelope area of 68.5 m². The external wall of the bungalow 1 consists of insulating sandwich panels comprising a polyurethane layer of thickness 35 mm inserted between two metal plates, of a door (considered to form part of the wall) and of two glazings which are triple glazings.

The method is implemented while the bungalow 1 is unoccupied.

The thermal transmittance U of the envelope of the bungalow 1, determined using ISO standard 13789:2007, leads to a reference value of the heat loss coefficient of the bungalow $K_{ref}$ of 60 W/K±12 W/K. The bungalow is a very lightweight building, that is to say has very low thermal inertia. Its time constant is a few hours.

The heating of the bungalow 1 is ensured by electric heating mats 2, where each heating mat has a nominal power of 112.5 W. The heating mats 2 are distributed in the bungalow by being placed vertically and rolled up, as shown schematically in FIG. 1, thereby allowing fast and homogeneous heating of the bungalow.

The method according to the invention is implemented continuously in its entirety over a single nocturnal time period, so as to circumvent the contribution of the solar radiation to the heating of the bungalow 1.

To begin there is undertaken a heating of the bungalow over a first time period $D_1$ from 00h15 to 01h10, which corresponds to the application of a strictly positive first heating power $P_1$, and then a free cooling of the bungalow over a second time period $D_2$ from 01h10 to 02h05, which corresponds to the application of a substantially zero second heating power $P_2$. The second time period $D_2$ is immediately subsequent to the first time period $D_1$.

For each time period $D_k$, the power $P_k$ applied is substantially equal to the heating power imposed by the heating mats 2, except for the residual powers, originating in particular from the measurement and calculation hardware present in the bungalow for the implementation of the method. Power sensors, in the form of loop ammeters, measure the power delivered in the bungalow during the implementation of the method.

In a first step of the method, which corresponds to the first time period $D_1$, the heating of the bungalow 1 is undertaken with the aid of the heating mats 2. The first heating power $P_1$ applied over the first time period $D_1$ is chosen in such a way that the parameter $$\alpha = 1 - \frac{\Delta T_1(0) K_{ref}}{P_1}$$

lies between 0.3 and 0.8. In this example, the reference value $K_{ref}$ is equal to 60 W/K±12 W/K, the initial interior temperature inside the bungalow $T_{11d}$ is 25.6° C., and the initial temperature of the outside air $T_{21d}$ is 18.7° C., thus corresponding, for a value of the parameter α substantially equal to 0.4, to a value of the first heating power $P_1$ equal to about 1370 W.

The ambient temperature inside the bungalow $T_{11}$ is then measured every ten seconds, on the one hand in the vicinity of each construction element from among the floor, the ceiling, the wall, the two glazings, and on the other hand in the middle of the air volume. For this purpose, several temperature sensors, which in this example are Type K thermocouples, are installed in the ambient air in the bungalow, namely a thermocouple in the vicinity of each construction element and a thermocouple in the middle of the air volume at a height of 110 cm.

The curve representative of the evolution of the interior temperature $T_{11}$ in the vicinity of a glazing of the bungalow as a function of time during the first time period $D_1$ is shown in FIG. 2. As visible in this figure, the curve of temperature rise in the vicinity of the glazing exhibits a substantially linear part over the time interval $\Delta t_1$. Fitting an equation to this linear part of the curve gives a slope $a_1$ of 4.79 K/h. The values of slope $a_1$ for the various elements are given in Table 1 hereinbelow.

FIG. 2 also depicts the evolution of the temperature of the outside air $T_{21}$ during the first time period $D_1$. The temperature of the outside air $T_{21}$ over the time interval $\Delta t_1$ is sufficiently stable for it to be possible to consider it substantially constant and equal to the average temperature over the time interval $\Delta t_1$, namely in this example $T_{21m}=18.1°$ C.

Figure 3:
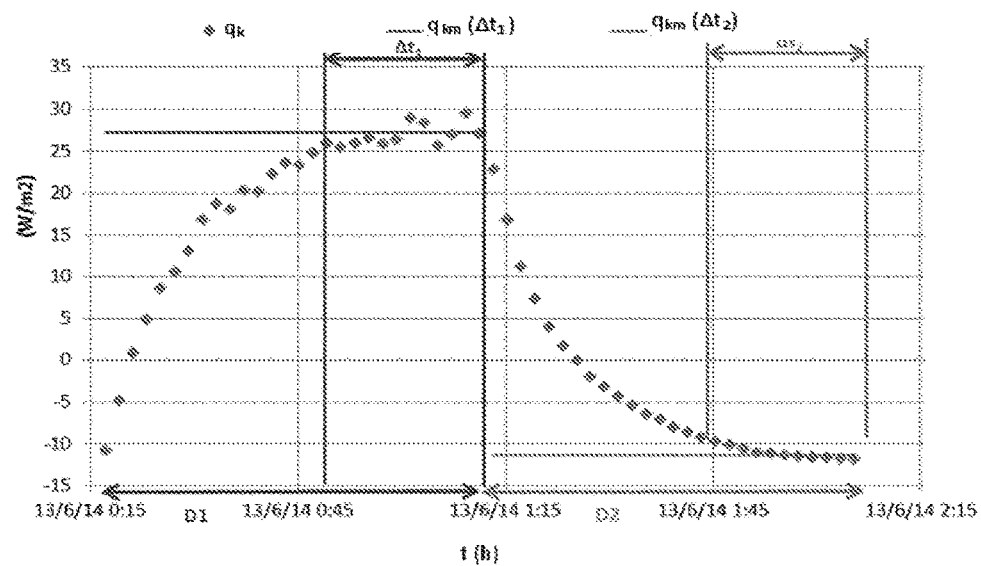

The heat flow rate through each construction element is also measured every ten seconds, with the aid of a gradient heat flow meter of the type HFP01 sold by the company Hukseflux positioned on the interior face of the construction element. By way of example, the curve representative of the evolution of the heat flow rate $q_1$ through a glazing as a function of time during the first time period $D_1$ is shown in FIG. 3. The values of mean flow rates $q_{1m}$ over the time interval $\Delta t_1$ for the various elements are given in Table 1 hereinbelow.

In a second step of the method, which corresponds to the second time period $D_2$, the substantially zero second heating power $P_2$ is applied in the bungalow 1, from a start temperature $T_{12d}=34.7°$ C., that is to say that the heating mats 2 do not operate during this second period $D_2$. As in the first step, the ambient temperature inside the bungalow $T_{12}$ is then measured every ten seconds, on the one hand in the vicinity of each construction element from among the floor, the ceiling, the wall, the two glazings, and on the other hand in the middle of the air volume, with the aid of Type K thermocouples installed in the ambient air in the bungalow, namely a thermocouple in the vicinity of each construction element and a thermocouple in the middle of the air volume at a height of 110 cm.

FIG. 2 shows the curve representative of the evolution of the interior temperature $T_{12}$ in the vicinity of a glazing of the bungalow as a function of time during the second time period $D_2$. As visible in this figure, the curve of temperature fall in the vicinity of the glazing exhibits a substantially linear part over the time interval $\Delta t_2$. Fitting an equation to this linear part of the curve gives a slope $a_2$ of −5.58 K/h. The values of slope $a_2$ for the various elements are given in Table 1 hereinbelow.

The evolution of the temperature of the outside air $T_{22}$ during the same time period $D_2$ is also shown in FIG. 2. As in the first step, the temperature of the outside air $T_{22}$ over the time interval $\Delta t_2$ is sufficiently stable for it to be possible to consider it substantially constant and equal to the average temperature over the time interval $\Delta t_2$, namely in this example $T_{22m}=17.1°$ C.

The heat flow rate through each construction element is also measured every ten seconds, with the aid of a gradient heat flow meter of the type HFP01 positioned on the interior face of the construction element. By way of example, the curve representative of the evolution of the heat flow rate $q_2$ through a glazing of the bungalow as a function of time during the second time period $D_2$ is shown in FIG. 3. The values of mean flow rates $q_{2m}$ over the time interval $\Delta t_2$ for the various elements are given in Table 1 hereinbelow.

As $$U = \frac{a_1 q_2 - a_2 q_1}{a_1 \Delta T_{2m} - a_2 \Delta T_{1m}},$$

by taking $\Delta T_{1m}=15.9°$ C., $\Delta T_{2m}=7.8°$ C., $q_{1m}=18.70$ W/m$^2$, $q_{2m}=-3.90$ W/m$^2$, we obtain the value of the thermal transmittance U of the glazings of the bungalow 1:

$U=0.68$ W/m$^2$K.

The values of the thermal transmittance U for the various constituent construction elements of the envelope of the bungalow 1 are given in Table 1 hereinbelow.

TABLE 1

| Element | $a_1$ (K/h) | $a_2$ (K/h) | $q_{1m}$ (W/m$^2$) | $q_{2m}$ (W/m$^2$) | $\Delta T_{1m}$ (° C.) | $\Delta T_{2m}$ (° C.) | U (W/m$^2$K) |
|---|---|---|---|---|---|---|---|
| Glazings | 4.79 | −5.58 | 18.70 | −3.90 | 15.9 | 7.8 | 0.68 |
| Wall (including door) | 4.46 | −5.42 | 21.97 | −4.47 | 16.7 | 8.1 | 0.78 |
| Floor | 4.13 | −4.21 | 7.82 | 0.25 | 13.3 | 8.0 | 0.38 |
| Ceiling | 4.42 | −5.75 | 6.66 | 5.28 | 16.8 | 8.1 | 0.46 |

By comparison, the value calculated according to ISO standard 6946:2007 of the thermal transmittance U of the wall is 0.70 W/m$^2$K±0.13 W/m$^2$K, and that of the ceiling is 0.43 W/m$^2$K±0.07 W/m$^2$K. Moreover, the value provided by the manufacturer, calculated according to ISO standard 10077:2012, of the thermal transmittance U of the glazings is 0.70 W/m$^2$K. For the floor, there is too much uncertainty to access a calculated value of the thermal transmittance U according to ISO standard 13370:2007.

By virtue of the measurements carried out during the time periods $D_1$ and $D_2$, it is also possible to determine the value of the heat loss coefficient K of the bungalow 1. As $$K = \frac{a_1 P_2 - a_2 P_1}{a_1 \Delta T_{2m} - a_2 \Delta T_{1m}},$$

by taking $\kappa_1=4.62$ K/h, $a_2=-5.37$ K/h, $\Delta T_{1m}=16.6°$ C., $\Delta T_{2m}=8.0°$ C., $P_1=1370$ W, $P_2=5$ W, we obtain the value of the heat loss coefficient K of the bungalow 1:

$K=58.70$ W/K.

It is then possible to plot the graph showing the distribution of the relative contributions of the various constituent construction elements of the envelope of the premises to the total heat loss of the premises. This graph, obtained by weighting the thermal transmittance U of each construction element by its lossy surface area A, is shown in FIG. 4. The detail for each construction element is given in Table 2 hereinbelow.

TABLE 2

| Element | U (W/m$^2$K) | A (m$^2$) | K (W/K) |
|---|---|---|---|
| Glazings | 0.68 | 3.9 | 2.65 |
| Wall (including door) | 0.78 | 37.6 | 29.3 |
| Floor | 0.38 | 13.5 | 5.1 |
| Ceiling | 0.46 | 13.5 | 6.2 |
| Others (infiltrations, thermal bridges, etc.) | — | — | 15.4 |

Obtaining the distribution of the losses between the various construction elements is a useful tool for prescription, in particular in a renovation context.

The data processing method described hereinabove corresponds to the case where the thermal model used is a simple R-C model with one resistor and one capacitor.

As a variant, the evolution curves of the interior temperature as a function of time for each constituent construction element of the envelope of the bungalow 1, namely the floor, the ceiling, the wall, the set of two glazings, have been processed with a 2R2C model of the bungalow with two resistors and two capacitors, a diagram of which is shown in FIG. 5.

In this 2R2C model, the exterior region is considered to be at imposed constant temperature $T_E$, two nodes $T_P$ and $T_1$ schematically represent the thermal masses of the walls and of the interior air and each have an associated value of inertia $C_1$, $C_2$, and two resistors $R_1$, $R_2$ are placed between the nodes. One resistor $R_2$, placed between the exterior region and the node of the walls, represents the resistance of the wall, while the other resistor $R_1$, placed between the node of the walls and that of the interior region, represents the interior convection resistance. In this case, the heat loss coefficient K is the inverse of the total resistance, the sum of the two resistances of the network.

By way of example, FIG. 6 shows the fitting of the 2R2C model described hereinabove to the evolution of the interior temperature $T_{1k}$ in the vicinity of a glazing as a function of time t, shown in FIG. 2. The values of the thermal transmittance U obtained for the various constituent construction elements of the envelope of the bungalow 1 in the case where the thermal model used is a 2R2C model are given in Table 3 hereinbelow.

TABLE 3

| Element | U (W/m²K) |
| --- | --- |
| Glazings | 0.68 |
| Wall (including door) | 0.78 |
| Floor | 0.56 |
| Ceiling | 0.45 |

It is noted that the values of thermal transmittance U obtained with the 2R2C model are consistent overall with those obtained with the simple R-C model, certain disparities being related to a greater inaccuracy of the approach via the 2R2C model.

In practice, in the previous example with the simple R-C model, the steps of selection of the time intervals $\Delta t_k$ for the data processing, of linearization, and of calculation of U and K on the basis of the slopes $a_k$, are advantageously carried out by means of an electronic calculation unit.

The invention is not limited to the examples described hereinabove.

In particular, the method according to the invention can be implemented with heating means with which the first environment is fixedly equipped and/or with heating means which are brought into the first environment specifically for the implementation of the method, as long as the power provided by these heating means for the impulses required by the method can be accurately determined.

Furthermore, in the above examples, the method for determining a quantity representative of the thermal resistance of a wall and the method for determining the heat loss coefficient of a premises are implemented with time periods $D_k$ corresponding to distinct heating power settings $P_k$. Of course, as a variant, the heating power can vary on one (or more) of the time periods $D_k$, provided that it ensures over the period $D_k$ an average heating power $P_k$ distinct from the heating powers applied over time periods that surround it. In this case, the heating power $P_k$ considered is the average heating power over the time period $D_k$.

The invention claimed is:

1. A method for determining a quantity representative of the thermal resistance of a dividing wall between a first environment and a second environment, the method comprising:
    measuring, at spaced time intervals in a first time period $D_1$, a temperature $T_{1k}$ in the first environment and a first heat flow rate through the dividing wall, the first heat flow rate corresponding to a first heating power $P_1$ in the first environment;
    measuring, at spaced time intervals in a second time period $D_2$, the temperature $T_{1k}$ in the first environment and a second heat flow rate through the dividing wall, the second heat flow rate corresponding to a second heating power $P_2$ in the first environment;
    the first time period and the second time period being successive time periods;
    determining a value of the quantity representative of the thermal resistance of the dividing wall by converging (1) a thermal model expressing a temporal variation of the temperature $T_{1k}$ in a first model environment, the dividing wall separating the first model environment from a second model environment, the temporal variation being expressed as a function of (i) the first and second heat flow rates through the dividing wall, (ii) the temperature in the second model environment, and (iii) physical parameters of the dividing wall, with (2) a measured evolution of the temperature $T_{1k}(t)$, in the first model environment as a function of time; and
    adjusting the physical parameters of the dividing wall based on the convergence of the thermal model and the measured evolution.

2. The method according to claim 1, wherein the first and second time periods correspond to different temperature settings applied in the first environment.

3. The method according to claim 1, wherein the measurements of the first and second heat flow rates through the dividing wall are measured by at least one heat flow sensor positioned on a face of the dividing wall.

4. The method according to claim 3, wherein the measurements of the temperature in the first environment $T_{1k}$ are measured by at least one temperature sensor positioned in the first environment.

5. The method according to claim 1, wherein the measurements of the temperature in the first environment $T_{1k}$ are measured by at least one ambient temperature sensor positioned in an air volume contained within the first environment.

6. The method according to claim 1, wherein the measurements of the temperature in the first environment $T_{1k}$ are measured by at least one surface temperature sensor positioned on or facing a surface of the dividing wall in the first environment.

7. The method according to claim 1, wherein the first thermal model is an R-C model with one resistor and one capacitor.

8. The method according to claim 7, the method further comprising selecting, for each of the first time period and second time period, a time interval $\Delta t_k$ in which the measured temperature $T_{1k}$ in the first environment as a function of time is linear, and
    the thermal model and the measured temperature are made to match in the following manner:
        for each time period, the slope $\alpha_k$ of a tangent to the curve $T_{1k}(t)$ is determined over the time interval $\Delta t_k$, and a value of the quantity representative of the thermal resistance of the dividing wall is determined based on of a slope $\alpha_k$ and based on a mean heat flow rate through the dividing wall $q_{km}$ taken over the respective time period.

9. The method according to claim 1, wherein the method further comprises:
applying, over the first time period $D_1$, the first heating power $P_1$ of the first environment, the first heating power $P_1$ being selected such that a parameter $$\alpha = 1 - \frac{\Delta T_1(0) K_{ref}}{P_1}$$

is less than or equal to 0.8 with $\Delta T_1(0)=T_{11}(t=0)-T_{2m}$, where t=0 is a start point of the first time period $D_1$, $T_{2m}$ is an average temperature in the second environment over the time periods $D_1$ and $D_2$, and $K_{ref}$ is a reference value of the heat loss coefficient K of the first environment;
after the first time period, applying, over the second time period $D_2$, the second heating power $P_2$ of the first environment, the second heating power being equal to zero.

10. The method according to claim 9, wherein the first heating power $P_1$ is selected such that the parameter $$\alpha = 1 - \frac{\Delta T_1(0) K_{ref}}{P_1}$$

is greater than or equal to 0.25.

11. The method according to claim 1, wherein, for each of the first and second time periods, the respective first and second heating powers $_k$ are provided by at least one controlled power source.

12. The method according to claim 11, wherein each of the at least one controlled power source is fixed in the first environment.

13. The method according to claim 11, the method further comprising positioning the controlled power source in the first environment.

14. A method for determining thermal properties of a premises, the premises comprising:
a plurality of construction elements, each construction element being a dividing wall between a first environment, which is the interior of the premises, and a second environment, which is the exterior of the premises;
determining a quantity representative of the thermal resistance of each construction element using the method of claim 1; and
wherein the measurements of the first heat flow rate, the second heat flow rate, and the temperature of the first environment are performed for all of the construction elements over the same time period.

15. The method according to claim 14, the method further comprising: determining a heat loss coefficient K of the premises based on a thermal transmittance of the construction elements.

16. The method according to claim 15, wherein determining the heat loss coefficient K of the premises includes:
measuring, over each of the time periods, a temperature inside the premises at spaced time intervals, and determining a temperature of the outside air at the spaced time intervals;
determining a value of the heat loss coefficient K by converging (1) a thermal model expressing a temporal variation of the temperature inside a model premises as a function of (i) a heating power applied in the model premises, (ii) the temperature of the outside air, and (iii) physical parameters of the model premises, with (2) measured evolution of the temperature inside the premises as a function of time; and
calculating the heat loss coefficient of the premises based on the convergence of the thermal model and the measured evolution.

17. A non-transitory computer readable medium storing thereon instructions that when executed by a computer cause the computer to execute the method according to claim 1.

18. A device for implementing the method according to claim 1, wherein the device comprises:
at least one heating element including a controlled power source;
at least one heat flow sensor positioned on a face of the dividing wall measuring the first and second heat flow rates through the dividing wall;
at least one temperature sensor measuring the temperature in the first environment $T_{1k}$;
circuitry configured to perform the determining of the value of the quantity representative of the thermal resistance of the dividing wall.

19. The device according to claim 18, wherein each heating element heats air in the first environment.

20. The device according to claim 18, wherein the at least one temperature sensor includes at least one ambient temperature sensor that measures a temperature of the air in the first environment.

21. The device according to claim 18, wherein the at least one temperature sensor includes a surface temperature sensor that measures a surface temperature of the dividing wall in the first environment.

22. The device according to claim 18, wherein the circuitry is configured to control the controlled power source of the at least one heating element.

23. The device according to claim 18, further comprising:
at least one box comprising both the at least one heat flow sensor and the at least one temperature sensor, and
a data communicating connection between the box and the circuitry.

* * * * *